United States Patent
Scott et al.

(10) Patent No.: US 10,245,940 B2
(45) Date of Patent: Apr. 2, 2019

(54) DUAL FUEL TANK FOR LOCOMOTIVE AND MARINE APPLICATIONS

(71) Applicant: CNGmotive Inc., Frankfort, IL (US)

(72) Inventors: David I. Scott, Frankfort, IL (US); Pedro T. Santos, Houston, TX (US)

(73) Assignee: CNGMOTIVE, INC., Frankfort, IL (US)

( * ) Notice: Subject to any disclaimer, the term of this patent is extended or adjusted under 35 U.S.C. 154(b) by 157 days.

(21) Appl. No.: 15/188,603

(22) Filed: Jun. 21, 2016

(65) Prior Publication Data

US 2017/0361702 A1    Dec. 21, 2017

(51) Int. Cl.
| | | |
|---|---|---|
| *B60K 15/03* | (2006.01) | |
| *B63B 11/04* | (2006.01) | |
| *B61C 17/02* | (2006.01) | |

(52) U.S. Cl.
CPC ........ *B60K 15/03* (2013.01); *B60K 15/03006* (2013.01); *B61C 17/02* (2013.01); *B63B 11/04* (2013.01); *B60K 2015/03059* (2013.01); *B60K 2015/03105* (2013.01); *B60K 2015/03157* (2013.01); *B60K 2015/03309* (2013.01)

(58) Field of Classification Search
CPC ... B60K 5/00; B60K 6/00; B60K 6/08; B60K 15/00; B60K 15/03; B63B 27/24; B63B 11/04
See application file for complete search history.

(56) References Cited

U.S. PATENT DOCUMENTS

| | | |
|---|---|---|
| 308,948 A | 12/1884 | Bruce |
| 2007/0284156 A1 | 12/2007 | Grady et al. |
| 2013/0199406 A1 | 8/2013 | Kanda |
| 2015/0184618 A1 | 7/2015 | Lee et al. |
| 2015/0233282 A1* | 8/2015 | Bandyopadhyay ..... F02B 37/00 60/603 |
| 2015/0377153 A1 | 12/2015 | Gallagher et al. |

FOREIGN PATENT DOCUMENTS

| | | |
|---|---|---|
| WO | 2014/031999 A2 | 2/2014 |
| WO | 2014/153110 A2 | 9/2014 |

OTHER PUBLICATIONS

Filament Winding of Carbon Fiber and Fiberglass Structures, May 19, 2016, http://advancedcomposites.com/manufacturing-techniques/filament-winding, (8 pages).
United States Patent and Trademark Office acting as International Searching Authority, International Search Report and Written Opinion in corresponding Application No. PCT/US2017/036115 dated Sep. 21, 2017 (10 pages).

\* cited by examiner

*Primary Examiner* — Robert J McCarry, Jr.
(74) *Attorney, Agent, or Firm* — Neal, Gerber & Eisenberg LLP

(57) ABSTRACT

A dual-fuel tank houses one or more compressed natural gas (CNG) vessels and one or more diesel fuel vessels. The diesel fuel vessels are generally disposed laterally outwardly from the CNG vessels to provide a buffer that protects the CNG vessels from side impacts. The dual-fuel tank may be retrofit onto a diesel locomotive in place of the locomotive's diesel fuel tank to convert the locomotive into a dual-fuel locomotive. The dual-fuel tank may be provided in a ship.

40 Claims, 10 Drawing Sheets

DUAL FUEL TANK FOR LOCOMOTIVE AND MARINE APPLICATIONS

TECHNICAL FIELD

The present invention generally relates to fuel tanks for vehicles such as train locomotives and ships.

BACKGROUND

Railroad locomotives such as diesel-electric locomotives transport goods and people on rails. Diesel-electric locomotives are powered by diesel engines that drive electric generators, which, in turn, drive electric motors that drive the locomotives' wheels. In various conventional diesel-electric locomotives, a diesel fuel tank is mounted to the locomotive between the front and rear wheels on an underside of the locomotive.

There has been increasing interest in using natural gas to power railroad locomotives, based on the relative price of natural gas and diesel fuel on a per unit of energy basis. Railroad locomotives have been designed to facilitate the use of a combination of diesel fuel and natural gas to drive the locomotive's engine(s) using the diesel cycle. Various conventional arrangements for dual fuel (e.g., natural gas and diesel fuel) configurations for locomotives call for a separate vehicle, also referred to as a fuel tender or a locomotive appurtenance, that contains the natural gas storage vessels in the form of liquid natural gas (LNG) or in the form of compressed natural gas (CNG) while the locomotive carries the conventional diesel fuel tank. The fuel tender connects to the locomotive to supply natural gas from the tender to the locomotive and its engine(s).

Marine vessels (e.g., large ships) are configured to combust multiple different fuels and will typically combust the cheapest fuel permitted in their location. More specifically, large ships typically combust heavy fuels (e.g., No. 6, which is also known as Bunker C, Furnace Fuel Oil, FFO, or Residual Fuel Oil) in unregulated zones (e.g., open sea). The large ships switch to cleaner fuels such as low sulfur diesel in regulated zones (e.g., near coastline).

To traverse through water, large ships include engines configured to burn the above fuels (these engines are referred to as diesel engines, although as stated above, the engines may be configured to burn, for example, Bunker C) that drive electric generators, which in turn, power the ship's propellers to push the ship through water. Conventional ships store the various fuels (e.g., Bunker C and low sulfur diesel) in separate vessels. In some cases, the engines of the large ships drive the propellers via a mechanical transmission and without use of intermediate electric generators.

SUMMARY

One or more non-limiting embodiments provide a dual-fuel railroad locomotive with both diesel and natural gas storage compartments on the locomotive itself. According to various embodiments, the dual-fuel locomotive's engines are powered by diesel and natural gas that is supplied from the fuel compartments that are mounted to and supported by the locomotive itself (as opposed to a separate tender). In this manner, according to various embodiments, the dual-fuel locomotive may be operated without an additional tender.

One or more non-limiting embodiments provide a dual-fuel railroad locomotive that includes: a chassis; a plurality of front railroad wheels mounted to the chassis; a plurality of rear railroads wheels mounted to the chassis; a dual-fuel diesel engine supported by the chassis and operatively connected to the front and rear wheels to drive the front and rear wheels to propel the locomotive along a railroad track; and a dual-fuel tank mounted to the chassis between the front and the rear wheels. The dual-fuel tank includes a frame that mounts the dual-fuel tank to the chassis, at least one liquid fuel vessel supported by the frame, and at least one pressurized fuel vessel supported by the frame.

According to one or more embodiments, the at least one liquid fuel vessel is disposed at least partially laterally outwardly from the at least one pressurized fuel vessel.

According to one or more embodiments, the at least one liquid fuel vessel extends laterally outwardly farther than any portion of the at least one pressurized fuel vessel.

According to one or more embodiments, the at least one liquid fuel vessel is positioned to form a side-impact buffer that protects the at least one pressurized fuel vessel from side-impacts.

According to one or more embodiments, the at least one liquid fuel vessel comprises at least one diesel fuel vessel.

According to one or more embodiments, the at least one pressurized fuel vessel comprises at least one compressed natural gas vessel.

According to one or more embodiments, the locomotive complies with U.S. Federal Railway Administration and Association of American Railroads requirements S-580 & S-5506.

One or more non-limiting embodiments provide a method of converting a railroad locomotive into a dual fuel locomotive, the method including: removing a single-fuel tank from the railroad locomotive; and mounting a dual-fuel tank to the railroad locomotive in place of the single-fuel tank. The dual-fuel tank includes (1) a frame that mounts the dual-fuel tank to the chassis, (2) at least one liquid fuel vessel supported by the frame, and (3) at least one pressurized fuel vessel supported by the frame.

According to one or more embodiments, the method also includes after said mounting, operatively connecting the first and second compartments to the railroad locomotive so that the locomotive can be powered by fuel in the first and second compartments.

According to one or more embodiments, the first type of fuel comprises diesel fuel and the first compartment comprises a diesel fuel compartment.

According to one or more embodiments, the second type of fuel comprises natural gas and the second compartment comprises a natural gas storage compartment.

According to one or more embodiments, the second type of fuel comprises compressed natural gas and the natural gas storage compartment comprises a compressed natural gas storage vessel.

According to one or more embodiments, the at least one liquid fuel vessel is disposed at least partially laterally outwardly from the at least one pressurized fuel vessel after said mounting.

According to one or more embodiments, the at least one liquid fuel vessel is positioned to form a side-impact buffer that protects the at least one pressurized fuel vessel from side-impacts after said mounting.

One or more non-limiting embodiments provide a dual-fuel railroad locomotive comprising: a chassis; a plurality of railroad wheels mounted to the chassis; a dual-fuel diesel cycle engine supported by the chassis and operatively connected to the wheels to drive the wheels to propel the locomotive along a railroad track; a dual-fuel tank mounted to the chassis, the dual-fuel tank including: at least one liquid fuel vessel, and at least one pressurized fuel vessel.

According to one or more embodiments, the at least one liquid fuel vessel is disposed at least partially laterally outwardly from the at least one pressurized fuel vessel.

According to one or more embodiments, the at least one liquid fuel vessel is positioned to form a side-impact buffer that protects the at least one pressurized fuel vessel from side-impacts.

According to one or more embodiments, the at least one liquid fuel vessel extends laterally outwardly farther than any portion of the at least one pressurized fuel vessel.

According to one or more embodiments, the at least one liquid fuel vessel includes at least one diesel fuel vessel.

According to one or more embodiments, the at least one pressurized fuel vessel includes at least one compressed natural gas vessel.

According to one or more embodiments, the at least one liquid fuel vessel is a void at least partially defined by a frame of the chassis.

One or more non-limiting embodiments provide a method of converting a railroad locomotive into a dual fuel locomotive, the method comprising: removing a single-fuel tank from the railroad locomotive; mounting a dual-fuel tank to the railroad locomotive in place of the single-fuel tank, the dual-fuel tank including: at least one liquid fuel vessel and at least one pressurized fuel vessel.

According to one or more embodiments, the method includes after said mounting, operatively connecting the first and second compartments to the railroad locomotive so that the locomotive can be powered by fuel in the first and second compartments.

According to one or more embodiments, the at least one liquid fuel vessel includes diesel fuel.

According to one or more embodiments, the at least one pressurized fuel vessel includes natural gas.

According to one or more embodiments, the at least one liquid fuel vessel is disposed at least partially laterally outwardly from the at least one pressurized fuel vessel after said mounting.

According to one or more embodiments, the at least one liquid fuel vessel is positioned to form a side-impact buffer that protects the at least one pressurized fuel vessel from side-impacts after said mounting.

One or more non-limiting embodiments provide a dual-fuel tank comprising: a frame housing one or more liquid fuel vessels and one or more pressurized fuel vessels; wherein the pressurized fuel vessels are disposed laterally inward of the liquid fuel vessels such that the liquid fuel vessels protect the pressurized fuel vessels from a lateral impact to the frame.

According to one or more embodiments, the liquid fuel vessels are voids at least partially defined by the frame.

According to one or more embodiments, the voids are at least partially defined by curved internal plates longitudinally extending inside the frame.

According to one or more embodiments, the curved internal plates are C-shaped and form a barrier between the liquid fuel vessels and the pressurized fuel vessels.

According to one or more embodiments, the tank includes at least one fuel line in fluid communication with each of the vessels, and at least one of the fuel lines includes an electric heater configured to heat the fluid flowing therethrough.

According to one or more embodiments, the frame includes a first end plate and a second end plate and both of the first end plate and the second end plate support the pressurized fuel vessels.

According to one or more embodiments, the first end plate and the second end plate cooperate to suspend at least one of the pressurized fuel vessels inside of the frame such that said pressurized fuel vessel is only supported by the first end plate and the second end plate.

According to one or more embodiments, the first end plate defines at least one longitudinally extending central ring void.

According to one or more embodiments, the tank includes a slider ring slideably received in the at least one longitudinally extending central rings void, the slider ring being fixed to an end of one of the pressure vessels.

According to one or more embodiments, at least one of the pressurized vessels includes an inner rubber bladder encased in a non-sulfur reactive layer.

According to one or more embodiments, the non-sulfur reactive layer is a winding that includes a cross-weave of aramid fibers and fiberglass.

According to one or more embodiments, the winding excludes carbon-fiber.

According to one or more embodiments, the at least one of the pressurized vessels includes a non-sulfur reactive insulator encasing the non-sulfur reactive layer.

According to one or more embodiments, a vehicle includes an engine and the tank, and the engine is configured to draw and combust fuel from the liquid fuel vessels and the pressurized fuel vessels.

According to one or more embodiments, the first end plate and the second end plate cooperate to suspend at least one of the pressurized fuel vessels inside of the frame such that said pressurized fuel vessel is only supported by the first end plate and the second end plate.

According to one or more embodiments, the first end plate defines at least one longitudinally extending central ring void.

According to one or more embodiments, the tank includes a slider ring slideably received in the at least one longitudinally extending central rings void, the slider ring being fixed to an end of one of the pressure vessels.

According to one or more embodiments, at least one of the pressurized vessels includes an inner rubber bladder encased in a non-sulfur reactive layer.

According to one or more embodiments, the non-sulfur reactive layer is a winding that includes a cross-weave of aramid fibers and fiberglass.

According to one or more embodiments, the winding excludes carbon-fiber.

According to one or more embodiments, the at least one of the pressurized vessels includes a non-sulfur reactive insulator encasing the non-sulfur reactive layer.

According to one or more embodiments, a vehicle includes an engine and the tank and the engine is configured to draw and combust fuel from the liquid fuel vessels and the pressurized fuel vessels.

According to one or more embodiments, the engine is configured to vary the ratio of combusted liquid fuel to the ratio of combusted pressurized fuel.

According to one or more embodiments, a ship includes a dual-fuel engine configured to draw both liquid fuel and pressurized fuel from the tank.

According to one or more embodiments, the liquid fuel vessels include Bunker C fuel.

According to one or more embodiments, the ship includes heaters configured to lower the viscosity of the liquid fuel while the liquid fuel is drawn from the tank to the dual-fuel engine.

According to one or more embodiments, the non-sulfur reactive layer is a winding that includes a cross-weave of aramid fibers and fiberglass, the winding has an inner portion and an outer portion, and a density of the inner portion is different than a density of the outer portion.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranged, 2-10, 1-9, 3-9, etc.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
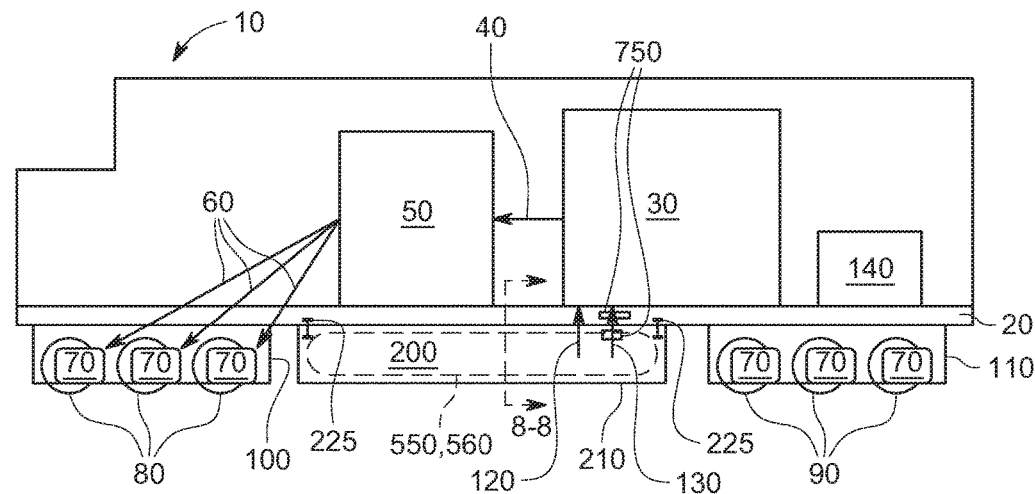
FIG. 1 is a diagrammatic side view of a railroad locomotive according to a non-limiting embodiment of the present invention.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or".

FIG. 1 illustrates a dual-fuel railroad locomotive 10 according to one or more embodiments. The locomotive includes a chassis (e.g., support frame) 20, which supports a diesel cycle engine 30. As explained below, the diesel cycle engine 30 may be a dual-fuel engine configured to combust a combination of natural gas and diesel. The engine 30 drives a driveshaft or a close coupling 40 that connects to an electric generator 50. The generator 50 connects via electrical wires 60 or other electrical conduits to electric motors 70 that drive the locomotive's front wheels 80 and rear wheels 90.

The number of motor/wheel sets may be greater or lesser than the six illustrated in FIG. 1 (e.g. 2, 4, 8, 10). The wheels 80, 90 are mounted on front and rear bogies 100, 110, which, in turn mount to and support the chassis 20. A dual-fuel tank 200 mounts to an underside of the chassis 20 between the front and rear bogies 100, 110 and wheels 80, 90. Fuel lines 120, 130 connect the tank 200 to the engine 30 (e.g., either directly or indirectly via another intermediate structure such as a structure that mixes or conditions the fuels) to provide the fuels to the engine to power the locomotive 20.

The locomotive 20 comprises a variety of additional structures 140, which may include one or more of the following:

a. an air compressor driven by the engine 30 to power the braking system of cars attached to the locomotive 20;

b. sanding gear to increase friction between the wheels 80, 90 and the rails upon which the locomotive 20 is traveling;

c. a control stand for the engineer operating the locomotive 20;
d. controls to enable the engineer to operate the locomotive 20; and
e. motor blower(s) to cool the motors 70.

According to various non-limiting embodiments, the locomotive 10 comprises an EMD SD40-2 diesel-electric locomotive in which the conventional diesel fuel tank is removed and replaced with the dual-fuel tank 200. The SD40-2's engine and fuel supply components are modified, as is well known in the art, to convert the locomotive's conventional diesel engine into the dual-fuel engine 30 of the locomotive 10. According to various embodiments, a diesel-only locomotive can be retrofitted to convert it into a dual-fuel locomotive by replacing the conventional diesel fuel tank with the dual-fuel tank 200. According to various embodiments, the retrofitting process is simplified because the tank 200 is shaped and configured to mount to a locomotive in place of a conventional diesel fuel tank that is disposed beneath the locomotive's chassis between the front and rear wheels. However, according to the alternative embodiments, the locomotive 10 is not a retrofit locomotive, but rather design built from the start to be a dual-fuel locomotive 10 without the tank 200.

According to various embodiments, the locomotive 10 weighs at least 50,000, 100,000, 200,000, and/or 300,000 lbs. fully fueled. According to various embodiments, the locomotive 10 weighs less than 2,000,000, 1,000,000, and/or 500,000 lbs. fully fueled.

Figure 17:
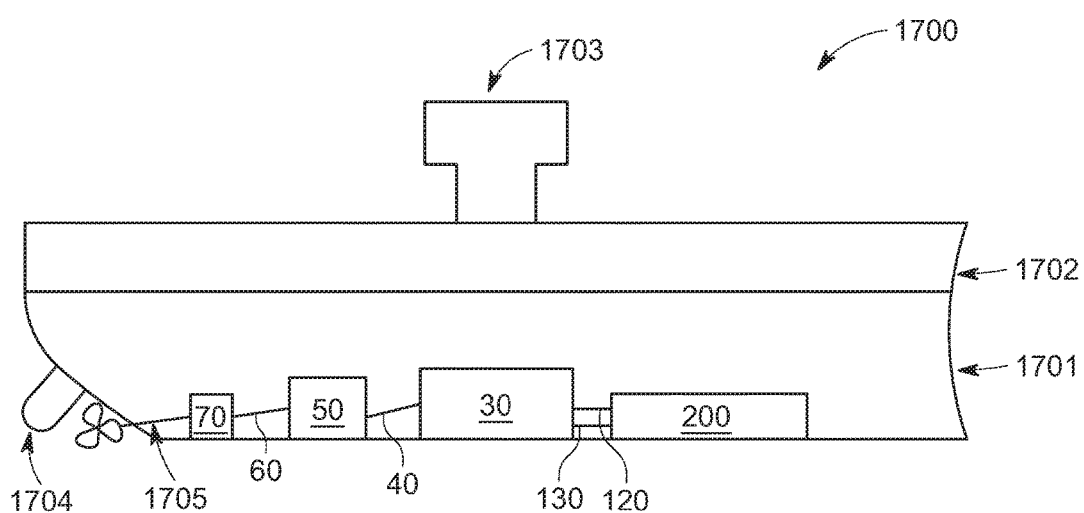
FIG. 17 is a diagrammatic side view of a ship according to a non-limiting embodiment of the present invention.

FIG. 17 illustrates a dual use ship 1700 according to one or more embodiments. The ship 1700 includes a hull 1701, a superstructure 1702, and a deckhouse 1703. The ship 1700 includes a rudder 1704 for steering and one or more propellers 1705 for propulsion through water. The hull 1701 defines space for the dual-use fuel tank 200, the dual-fuel engine 30 configured to combust a combination of natural gas and diesel and/or Bunker C, the electric generator 50, and the motors 70. Here, the motors 70 drive the propellers 1705 instead of wheels. These features are connected via components similar to the components of the locomotive 10 of FIG. 1. More specifically, the engine 30 drives a driveshaft or close coupling 40 that connects to an electric generator 50. The generator 50 links via electrical wires 60 or other electrical conduits to one or more electric motors 70 that power the one or more propellers 1705. The dual-fuel tank 200 supplies diesel and natural gas to the engine via the fuel lines 120, 130. It should generally be appreciated that when this disclosure refers to diesel, other fuels (e.g., No. 6, which is also known as Bunker C, Furnace Fuel Oil, FFO, or Residual Fuel Oil) are contemplated and may be substituted for the diesel. In various embodiments, the dual-fuel engine 30 of the dual use ship 1700 drives the propellers 1705 via a mechanical transmission and without the use of an electric generator 50 and/or a motor 70.

According to various embodiments, the engine 30 comprises a diesel cycle engine that is configured to operate using a combination of diesel fuel (or Bunker C, as noted above) and natural gas. Such dual-fuel diesel cycle engines are known in the art. According to various embodiments, the engine 30 is an 8, 12, 16, and/or 20 cylinder engine. However, according to alternative embodiments, the engine 30 may comprise any other type of suitable internal combustion engine without deviating from the scope of the present invention (e.g., a spark-ignited OTTO cycle engine, etc.). According to various embodiments, the engine 30 is at least a 1,000, 2,000, 2,500, and/or 3,000 HP engine. According to various embodiments, the engine 30 has between 1,000 and 10,000 HP, and/or between 1,000 and 5,000 HP.

During dual-fuel operation of the engine 30, natural gas is partially substituted for diesel fuel while the engine 30 performs the diesel cycle (or other cycle if Bunker C is used). Natural gas is separately conveyed from the diesel fuel (or Bunker C) and is provided to the engine's cylinders. During dual-fuel operation of the engine 30, natural gas is mixed and combusted with the diesel fuel inside of the cylinders. The ratio of natural gas to diesel (or Bunker C) is known as the substitution rate. The typical substitution rate is near 0% (almost entirely diesel fuel or Bunker C) during idling, and approaches near 100% (almost entirely natural gas) at high engine load. Dynamic apportioning of fuel usage is accomplished with known technology (i.e., technology common in the dual-fuel engine marketplace).

The generator 50 may comprise any combination of suitable electrical components. For example, according to various embodiments, the generator 50 comprises an alternator, AC-to-DC rectifier, and a DC-to-AC inverter that drives AC motors 70. According to other alternative embodiments, the generator 50 may comprise a DC generator that drives DC motors 70. According to other embodiments, the generator 50 may comprise an AC alternator and AC-to-DC rectifier that drives DC motors 70.

FIGS. 2-14 provide various views of the dual-fuel tank 200 that includes both a diesel fuel storage (i.e., vessels 500, 510) and compressed/pressurized natural gas storage (i.e., vessels 550, 560). Diesel fuel is loaded into vessels 500, 510, and compressed natural gas is loaded into vessels 550, 560. The locomotive 10 or the ship 1700 is then powered by a combination of diesel fuel and natural gas.

Figure 2:
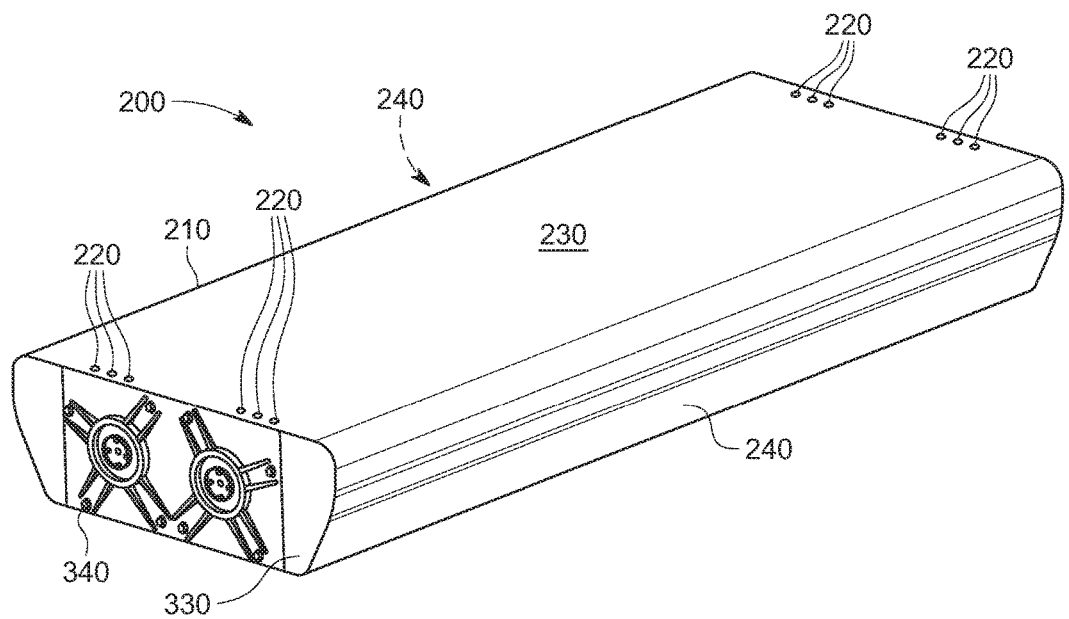
FIG. 2 is a top perspective view of a dual-fuel tank of the locomotive in FIG. 1 and/or a ship.
Figure 3:
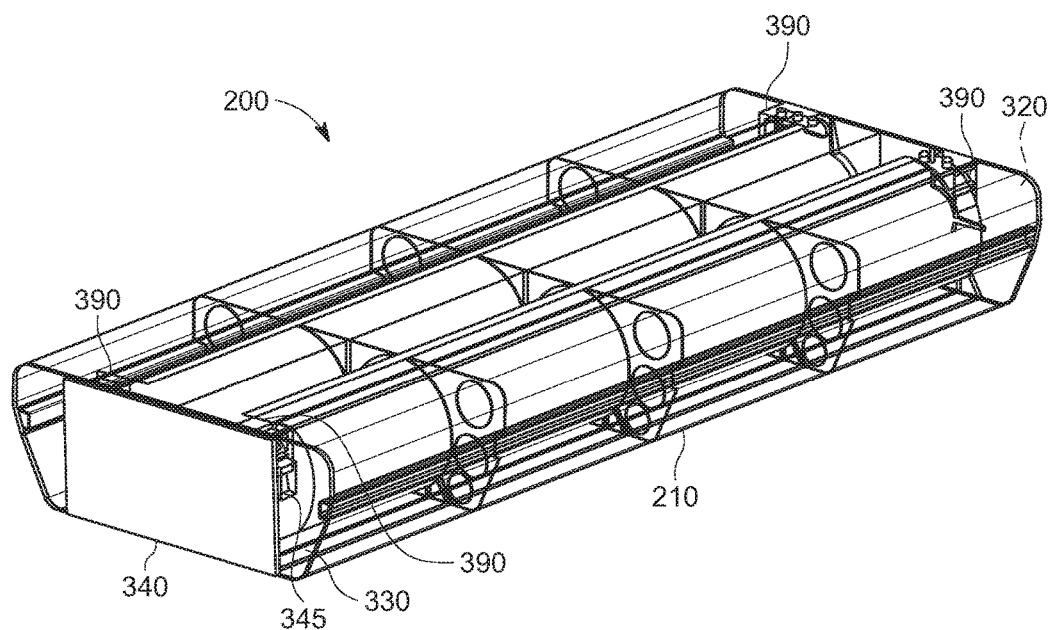
FIG. 3 is a partially transparent top perspective view of the dual-fuel tank in FIG. 2.
Figure 8:
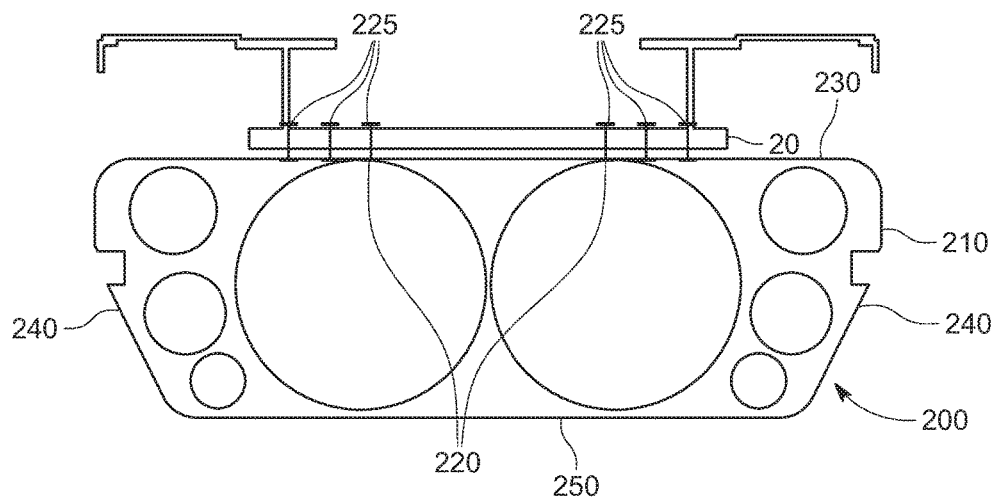
FIG. 8 is a partial diagrammatic cut-away view of the locomotive in FIG. 1, taken along the line 8-8 in FIG. 1.

As shown in FIGS. 1, 2 and 8, the tank 200 comprises a frame 210 that enables the tank 200 to mount to the chassis 20 of the locomotive 10. In the illustrated embodiment, the frame 210 includes a top plate 230 with a pattern of bolt holes 220 through which the tank 200 is bolted (via bolts 225) to the chassis 20 of the locomotive 10 (see FIG. 8).

Figure 4:
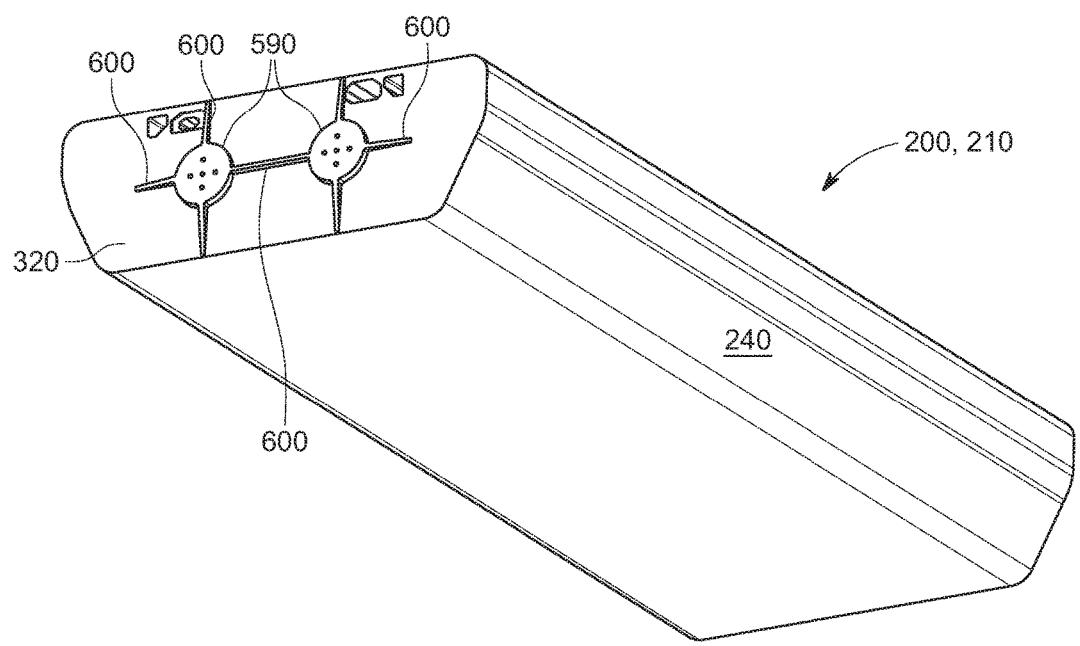
FIG. 4 is a bottom perspective view of the dual-fuel tank in FIG. 2.
Figure 5:
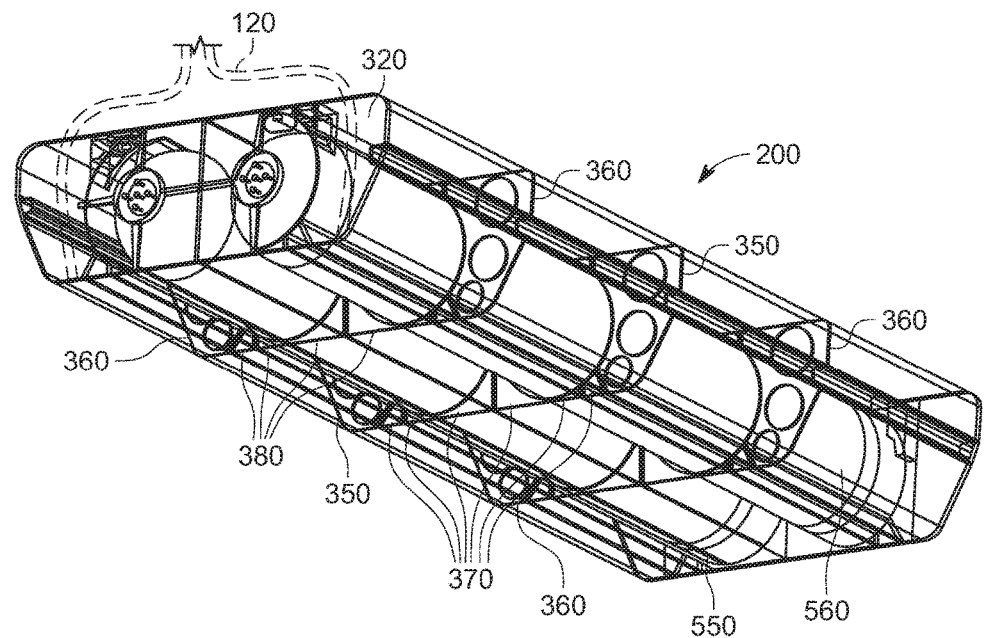
FIG. 5 is a bottom partially transparent perspective view of the dual-fuel tank in FIG. 2.
Figure 6:
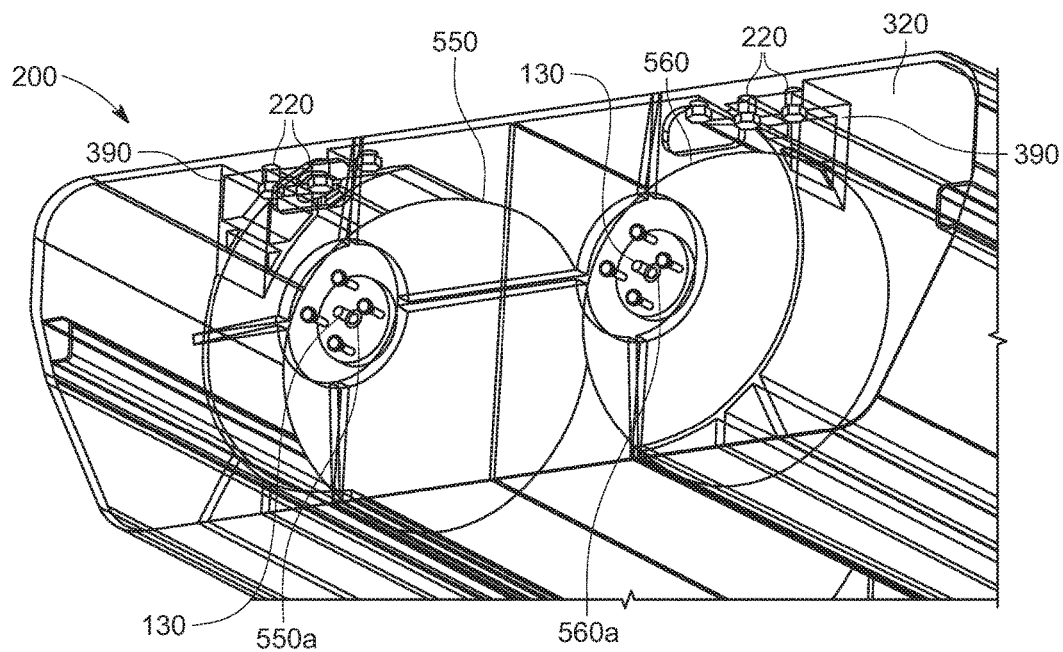
FIG. 6 is a close-up partial bottom partially transparent perspective view of the dual-fuel tank in FIG. 2.
Figure 9:
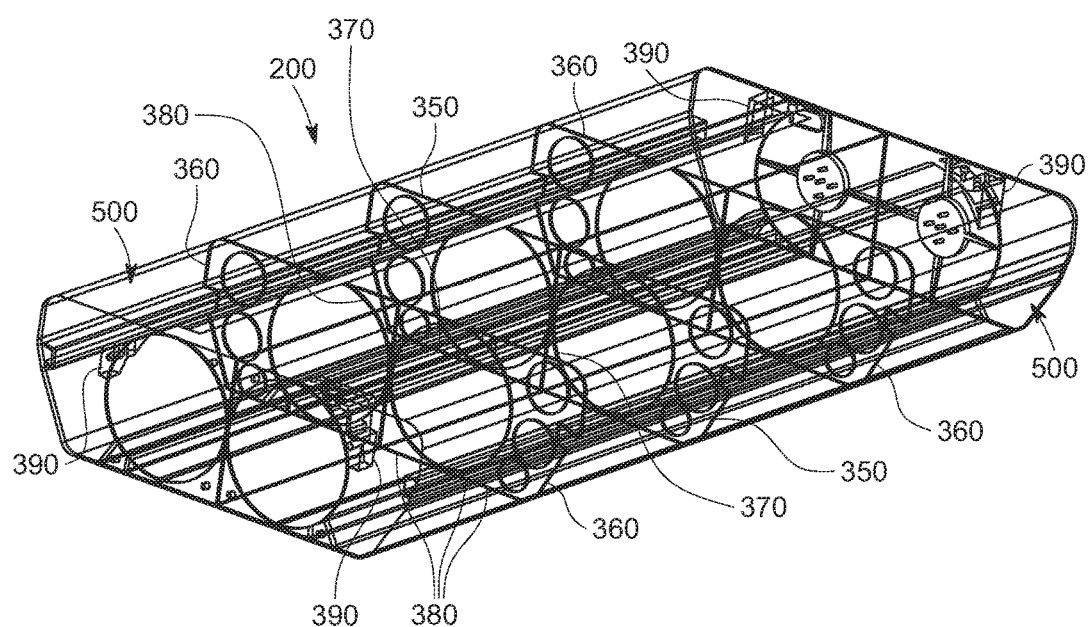
FIG. 9 is a transparent, wireframe bottom perspective view of the dual-fuel tank in FIG. 2.
Figure 12:
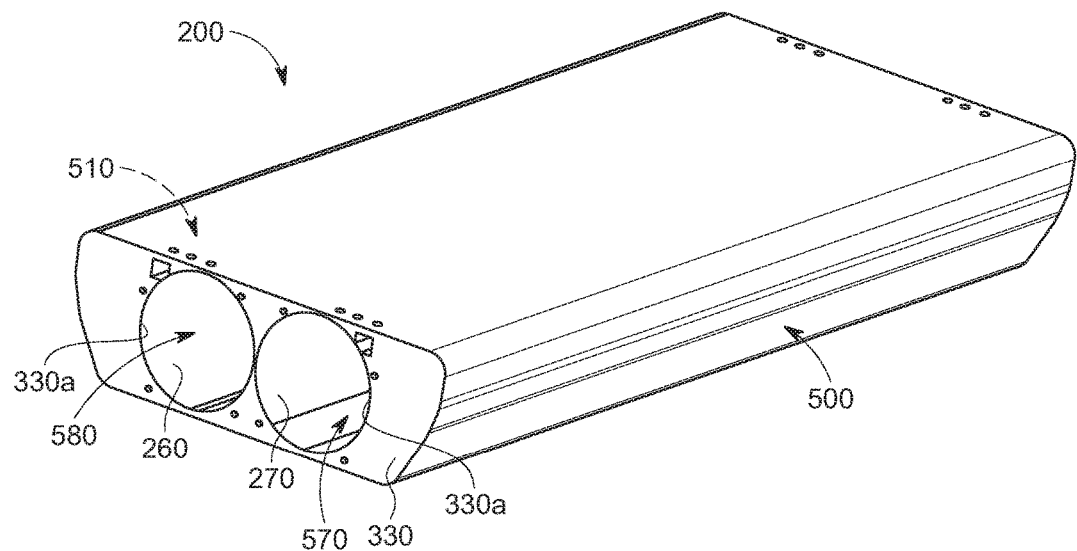
FIG. 12 is a top perspective view of the dual-fuel tank of FIG. 2 with the end plate and natural gas tanks removed.
Figure 13:
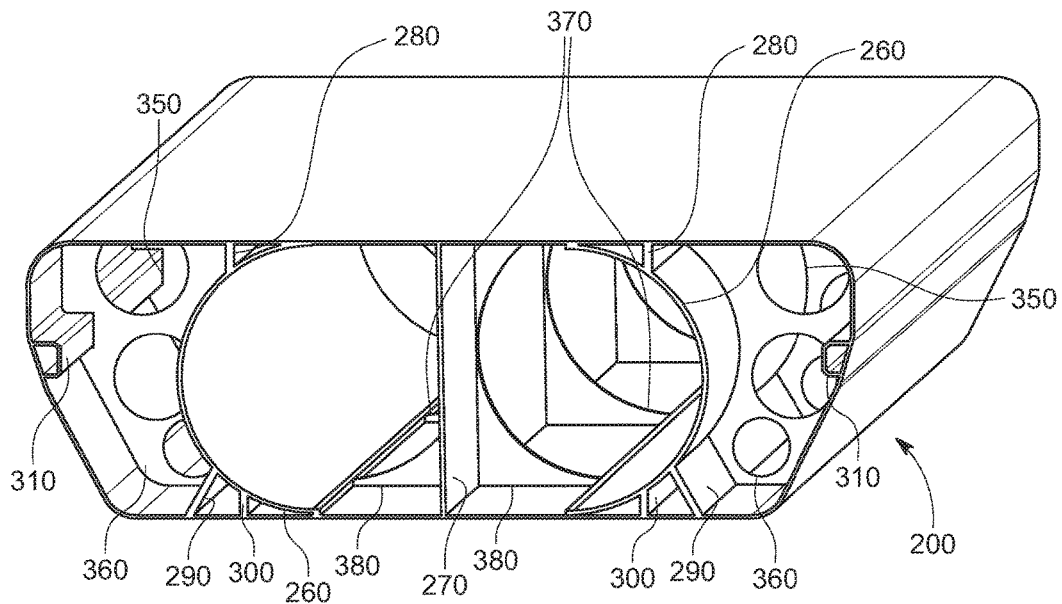
FIG. 13 is a partial top perspective cut-away view of the dual-fuel tank of FIG. 2 with the end plate and natural gas tanks removed.
Figure 14:
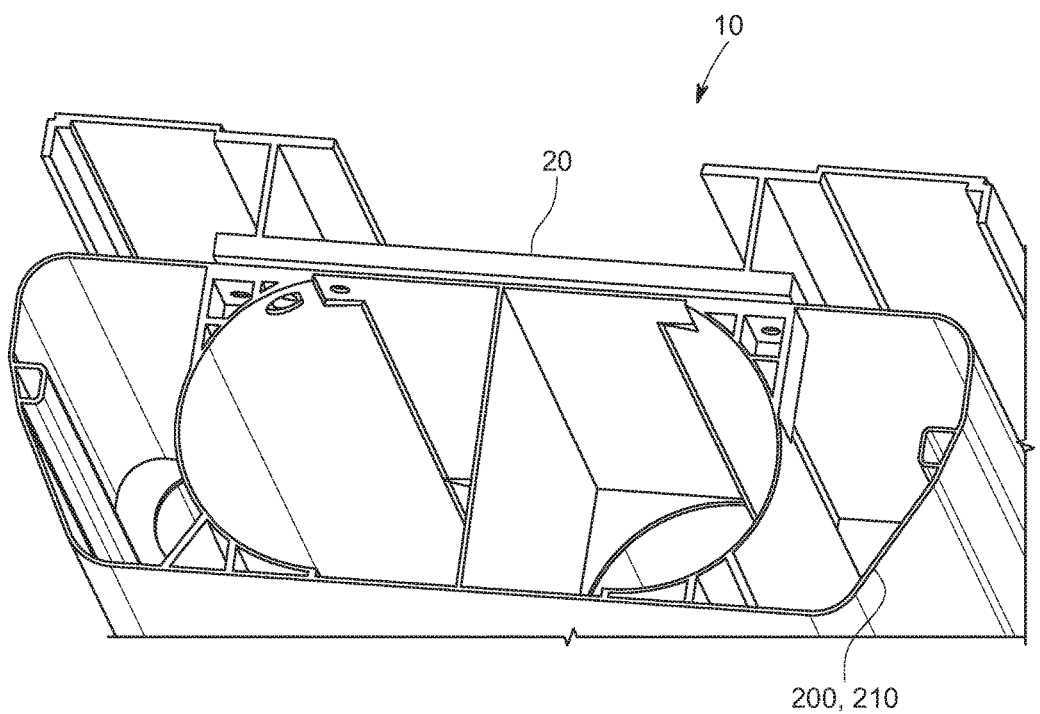
FIG. 14 is a partial bottom perspective cut-away view of the locomotive of FIG. 1.

As shown in FIGS. 2-14, the frame 210 comprises:
a. the top plate 230 (e.g., ½" thick plate) (see FIGS. 2, 8, 11);
b. lateral side plates 240 (e.g., ½" thick plate) (see FIGS. 2, 4, 8, 11);
c. a bottom plate 250 (e.g., ½" thick plate) (see FIGS. 4, 8, 11);
d. curved internal plates 260 (e.g., ½" thick plate) (see FIGS. 11, 13);
e. a central vertical plate 270 (e.g., ½" thick plate) (see FIGS. 11, 13);
f. longitudinal reinforcement ribs 280, 290, 300 (e.g., ½" thick plate) (see FIGS. 11, 13);
g. side supports 310 (e.g., ½" thick U-channel) (see FIGS. 11, 13);
h. a fixed-end end plate 320 (e.g., 1" thick plate) (see FIGS. 4-6);
i. a floating-end end plate 330 (e.g., 1" thick plate) (see FIGS. 2, 7, 12);
j. floating-end end cap 340 (e.g., 1" thick plate) (see FIGS. 2, 3, 7);
k. end-cap mounting blocks 345 (see FIG. 7);
l. central lateral diesel tank gusset plates 350 (e.g., 1" thick plate with holes to permit diesel fuel passage therethrough and to lighten the plate) (see FIGS. 5, 9, 13);

m. distal lateral diesel tank gusset plates 360 (e.g., ½" thick plate with holes to permit diesel fuel passage therethrough and to lighten the plate) (see FIGS. 5, 9, 13);

n. central lateral gusset plates or stringers 370 (e.g., 1" thick plate) (see FIGS. 5, 9, 13);

o. distal lateral gusset plates 380 (e.g., ½ " thick plate) (see FIGS. 5, 9, 13); and p. locomotive mounting-reinforcement blocks 390 (e.g., machined or cast blocks) (see FIGS. 3, 6), through which the bolt holes 220 pass (see FIG. 6).

As shown in the above-referenced figures, in the illustrated embodiment, the various plates 230, 240, 250, 260, 270, 320, 330, 350, 360, 370, 380, ribs 280, 290, 300, supports 310, and blocks 345, 390 comprise a strong material such as steel and are welded together along their lines of contact (or otherwise fastened together or integrally formed).

Two or more of the components of the frame 210 may be integrally formed. For example, according to various alternative embodiments, the top, side, and bottom plates 230, 240, 250 may comprise a single plate that is bent into the semi-tubular shape of the frame 210.

Figure 10:
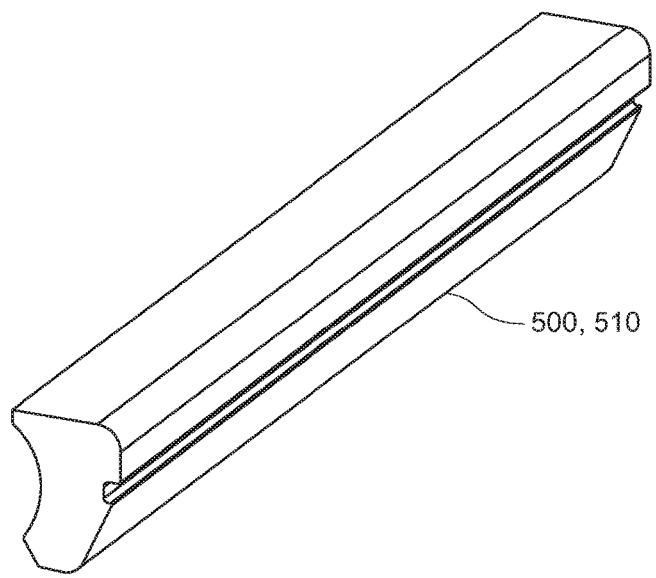
FIG. 10 is a top perspective view of the general shape of the interior compartment of a diesel fuel vessel of the dual-fuel tank in FIG. 2.
Figure 11:
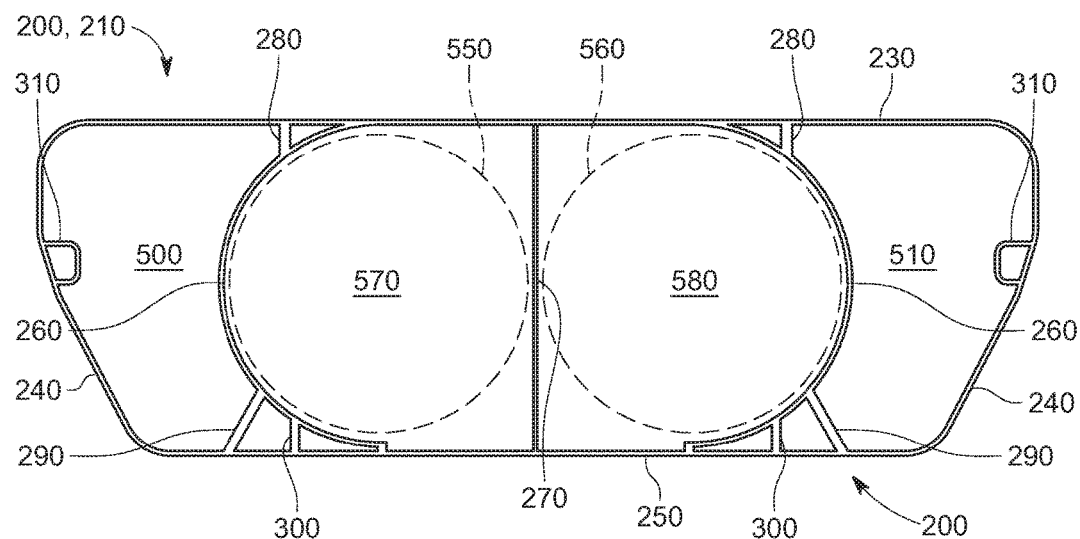
FIG. 11 is a diagrammatic end view showing the location of the fuel tanks of the dual-fuel tank in FIG. 2 and illustrating structural features of a tank frame.

As shown in FIGS. 9 and 11, the top, side, bottom, and end plates 230, 240, 250, 260, 270, 320, 330 together define two diesel fuel vessels 500, 510, that generally each have the shape shown in FIG. 10. Vessels 500, 510 may be fluidly connected to each other or may be fluidly isolated from each other. As shown in FIGS. 1 and 5, the fuel line 120 fluidly connects vessels 500, 510 to the engine 30 to provide diesel fuel to the engine 30. As shown in FIG. 11, vessels 500, 510 may be shaped to occupy the spaces between each of vessels 550, 560 (discussed below) and the outer envelope of the tank 200. According to various embodiments, vessels 500, 510 collectively have a diesel fuel capacity of at least 500, 750, 1,000, 1,250, 1,500, 2,000, 2,500, and/or 3,000 gallons. According to various embodiments, vessels 500, 510 collectively have a diesel fuel capacity of less than 20,000, 10,000, 9,000, 8,000, 7,000, 6,000, 5,000, 4,000, 3,000, 2,500, 2,250, and/or 2,000 gallons.

The dual-fuel tank 200 includes two compressed/pressurized natural gas vessels 550, 560 that are inserted into central spaces 570, 580 in the frame 210 (see FIGS. 11, 12) via openings 330a in the end plate 330 (see FIG. 12). As shown in FIG. 6, vessels 550, 560 are bolted or otherwise attached to the fixed-end end plate 320. As shown in FIGS. 4 and 6, the end plate 320 is reinforced via a round 1" thick reinforcing plate 590 and a plurality of gussets 600 to strengthen the connection between vessels 550, 560 and the frame 210 via the end plate 320.

Figure 7:
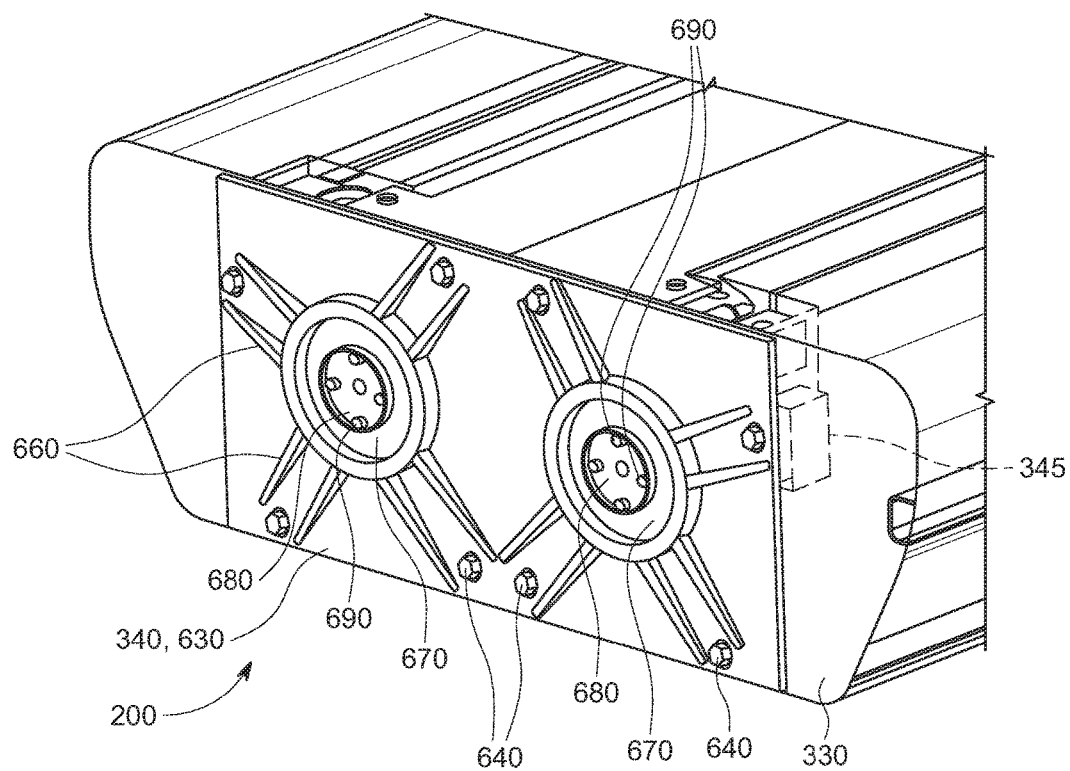
FIG. 7 is a close-up partial top partially transparent perspective view of the dual-fuel tank in FIG. 2.

On the opposite longitudinal end of the tank 200 (see FIGS. 2, 3, and 7), a floating-end end cap 340 is bolted (or otherwise fastened) to the remainder of the frame 210 to enclose vessels 550, 560 within the tank 200. As shown in FIG. 7, bolts 640 extend through holes in a main plate 630 of the end cap 340 and into mating bolt holes in the end plate 330 and reinforcement blocks 345 to secure the end cap 340 to the remainder of the frame 210.

As shown in FIG. 7, the end cap 340 comprises a main plate 630 and reinforcing rings 650 (e.g., 2" thick steel plates) that are welded or otherwise fastened to the plate 630. The end cap 340 includes reinforcing gussets 660 that are welded or otherwise fastened to the plate 630 and rings 650. The end cap 340 includes slider rings 670 that mount within holes defined in the main plate 630 and rings 650. Mounting plates 680 (e.g., 2" thick steel plates) are fixed or mounted to the slider rings 670. Vessels 550, 560 connect to the mounting plates 680 via bolts 690 or other suitable fasteners.

The end cap 340 permit a small degree of axial/longitudinal movement/float (i.e., along a longitudinal/axial direction of the tank 200 and vessels 550, 560) of the mounting plates 680 relative to the main plate 630. This movement allows for the axial expansion and retraction of vessels 550, 560 as they are pressurized and de-pressurized. The end cap 340 may facilitate such relative movement in any suitable way. For example, according to one or more embodiments, the inner portion of the slider rings 670 that mounts to the mounting plates 680 may deflect relative to the outer portion of the slider rings 670 that mount to the main plate 630 (e.g., similar to how a Belleville spring deflects). Alternatively, the slider rings 670 may rigidly connect to the mounting plates 680, but slidingly translate along a central reference axis of each of the rings 650 (e.g., such that the plate 630 and rings 650 act as a bushing in which the slider rings 657 reciprocate).

According to various embodiments, the end cap 340 and end plate 320 form the only structural connection between vessels 550, 560 and the remainder of the tank 200 (e.g., the frame 210). As a result, vessels 550, 560 do not physically contact the remainder of the tank 200 (i.e., do not physically contact the other internal features of the tank 200) as vessels 550, 560 axially expand and contract during use. Wear on vessels 550, 560 is therefore reduced, which extends their useful life.

According to various embodiments, the tank 200 may be oriented with the end cap 340 longitudinal end (i.e., the end shown in the lower left in FIG. 2) forward (i.e., to the left as shown in FIG. 1 and thus pointing in the same direction as the front of the locomotive 10 or ship 1700). According to the various alternative embodiments, the tank 200 may be oriented with the end cap 340 longitudinal end (i.e., the end shown in the lower left in FIG. 2) rearward (i.e., to the right as shown in FIG. 1 and thus pointing in the opposite direction as the front of the locomotive 10 or ship 1700). According to various embodiments, the tank 200 is oriented such that the longitudinal axes of vessels 550, 560 are generally oriented in the direction of travel of the locomotive 10 or ship 1700 (e.g. parallel to the railroad tracks upon which the locomotive 10 travels).

Vessels 550, 560 may be any type of vessel that is suitable for storing a fuel. For example, vessels 550, 560 may comprise compressed/pressurized natural gas vessels. Such compressed natural gas vessels may comprise any suitable material (e.g., steel, fiberglass, carbon fiber, etc.) and have any suitable shape (e.g., elongated cylinders with rounded ends) without deviating from the scope of the present invention. According to various embodiments, vessels 550, 560 are generally cylindrical and have a diameter between 24 and 40 inches, e.g., 36 inches.

Figure 18:
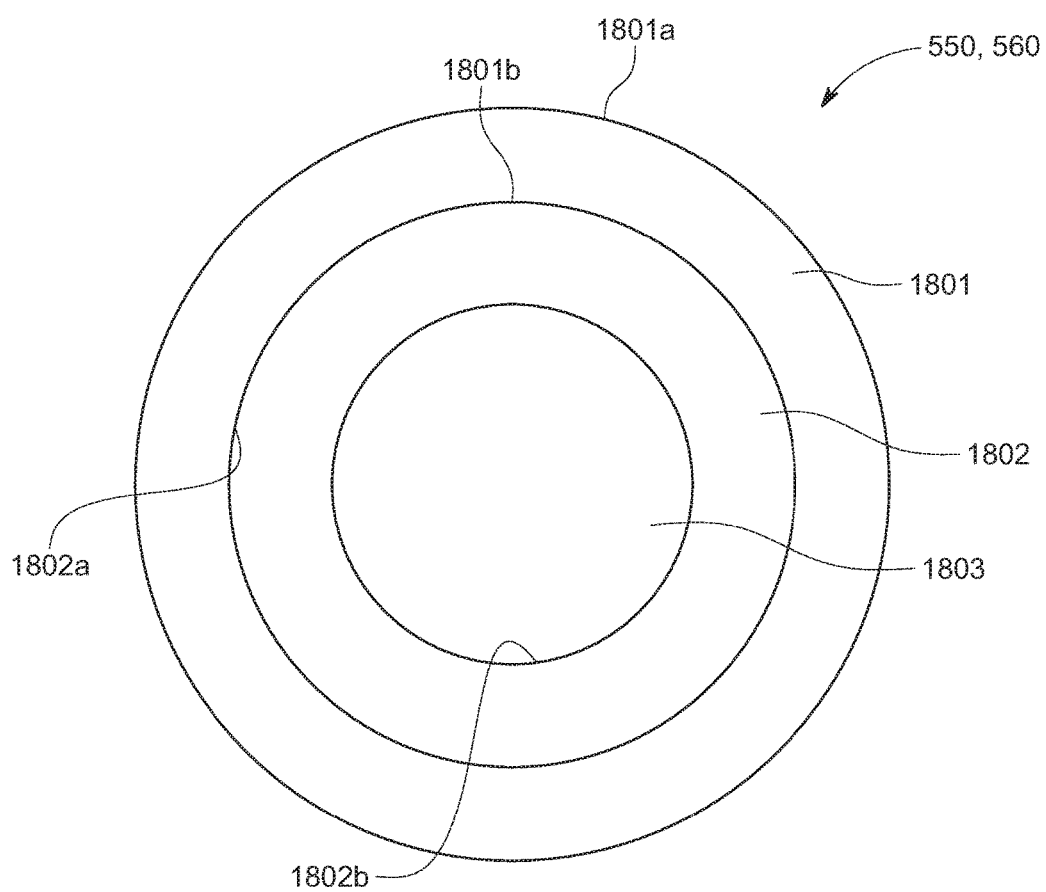
FIG. 18 is a cross sectional view of a vessel for storing a compressed gas, such as CNG. This vessel may be part of the dual-fuel tank of FIG. 2.

In a preferred embodiment, vessels 550, 560 have the construction generally shown and illustrated in the cross section of FIG. 18. More specifically, vessels 550, 560 include a rubber bladder 1802 with an inner surface 1802b and an outer surface 1802a. As stated above, the rubber bladder 1802 may resemble an elongated cylinder with rounded (i.e., closed) ends. The inner surface 1802b of the rubber bladder 1802 defines a void 1803 for storing CNG. The outer surface 1802a of the rubber bladder 1802 is wrapped and fully enclosed in a winding 1801 with an inner portion 1801b and an outer portion 1801a. The winding

1801 may comprise a cross-weave of aramid fibers and fiberglass. The cross-weave is optionally embedded in a resin matrix.

It should be appreciated that the architecture of the winding 1801 may be designed to minimize mechanical stress generated by large temperature gradients across the winding 1801. During use, the CNG in the void 1803 will be at a low temperature, thus cooling the inner portion 1801*b* of the winding 1801. The outer portion 1801*a* of the winding 1801 may be at a higher temperature. To minimize mechanical stress, the density of the winding 1801 may vary between the inner portion 1801*b* and the outer portion 1801*a*. In some embodiments, the inner portion 1801*b* has a lower density than the outer portion 1801*a*. In other embodiments, the inner portion 1801*b* has a greater density than the outer portion 1801*a*.

The winding 1801 offers advantages in addition to its high strength and structural integrity. First, because the winding 1801 is made of non-metallic material, the winding 1801 is robust against corrosion caused by Bunker C. More specifically, Bunker C typically contains sulfur and sulfur compounds that corrode and embrittle high-strength steels used in conventional CNG tanks. In various embodiments, the winding 1801 is made of any suitable material that does not react with sulfur (such as a cross-weave of aramid fibers and fiberglass optionally embedded in a resin matrix). Second, the winding 1801 is less dense (i.e., lighter than) high-strength steels. Thus, winding 1801, as opposed to high-strength steels, improves the buoyancy of the ship 1700 and the fuel efficiency of the locomotive 10 by reducing the weight of the ship 1700 and the weight of the locomotive 10. Third, the winding 1801 functions as a heat insulator, whereas high-strength steels are heat conductors. Therefore, the winding 1801 (as opposed to high-strength steel) discourages heat transfer between the void 1803 and the diesel fuel or Bunker C in vessels 500, 510.

As stated above, the winding 1801 may include a cross-weave of aramid fibers and fiberglass embedded in a resin matrix. In some embodiments, the cross-weave also includes carbon fiber. It should be appreciated, however, and especially in marine applications (e.g., ship 1700), carbon fiber may be disadvantageous and thus excluded from the winding 1801. Besides being expensive, carbon fiber has an extraordinarily low density (i.e., is extremely light). During construction, marine vessels, such as the ship 1700, are built to have a specific center of gravity and center of buoyancy. If these marine vessels are too light, then their center of gravity and center of buoyancy will shift from manufacturer specifications, thus presenting a capsizing risk. To reduce this risk and as stated above, embodiments of the winding 1801 specifically exclude carbon fiber. In various embodiments, the thickness and weight of the winding 1801 is adjusted via addition or removal of material to maintain the proper center of gravity and center of buoyancy of the ship 1700. Although not shown in FIG. 17, in various embodiments, vessels 550, 560 are wrapped or encased in a sacrificial layer for additional insulation. The sacrificial layer may be an extra layer of winding 1801. The sacrificial layer may be any other suitable non-metallic and/or non-sulfur reactive material.

According to various embodiments vessels 550, 560 each store between 200 and 2,000 diesel-gallon-equivalent worth of compressed natural gas (DGE). According to various embodiments, the storage capacity of each vessel 550, 560 is each at least 100, 150, 200, 300, 400, 500, 600, 700, 800, 900, and/or 1000 DGE worth of compressed natural gas. According to various embodiments, the storage capacity of each vessel 500, 560 is less than 5000, 4000, 3000, 2000, 1500, 1000, 900, 800, 700, and/or 600 DGE worth of compressed natural gas. According to various embodiments, vessels 550, 560 comprise Type 1, 2, 3, 4, and/or 5 vessels.

According to various embodiments, vessels 500, 510 have a combined diesel storage capacity of 1,000 gallons and vessels 550, 560 have a combined storage capacity of 1,200 DGE. According to other embodiments, vessels 500, 510 have a combined diesel storage capacity of 1,700 gallons and vessels 550, 560 have a combined storage capacity of 500 DGE.

As shown in FIG. 6, vessels 550, 560 each comprise a port 550*a*, 560*a* that fluidly connects to the fuel line 130. In the illustrated embodiment, the fuel line 130 passes through holes in the fixed end plate 320. However, according to various embodiments, the ports 550*a*, 560*a* may be disposed in any other suitable location on vessels 550, 560 without deviating from the scope of the present invention (e.g., on the floating-end end cap 340 side of the tank 200).

According to various embodiments, an operator refills the vessels through ports 550*a*, 560*a* (or other suitable ports). During the refilling process, the pressure and thus the temperature of the CNG inside vessels 550, 560 will rise. As a consequence, the operator may be required to refill vessels 550, 560 in multiple stages. The operator waits for vessels 550, 560 to cool (and thus the pressure of CNG resident in vessels 550, 560 to reduce) in-between stages.

For example, the operator may perform a first stage of refilling where the temperature and pressure of the CNG rises to 70 degrees Celsius and 400 psi. The operator may then wait for twelve hours for the CNG to cool to 40 degrees Celsius and reduce in pressure to 300 psi. The operator then performs the second stage of refilling, which raises the temperature of the CNG back to 70 degrees Celsius and 400 psi etc. To expedite the refilling process, the operator may control the rate of CNG flow into vessels 550, 560 based on a measured temperature and/or pressure of the CNG resident in vessels 550, 560. Proper control enables the operator to refill vessels 550, 560 in a single stage.

As shown in FIG. 1, the locomotive 10 includes one or more heaters 750 that heat the natural gas before entering the engine 30. The heater 750 is powered by onboard utilities of the locomotive 10. For example, the heater 750 may use heat from the engine 30 itself or the motors 70 (e.g., via a heat exchanger) and/or may be powered by the locomotive's electrical supply (e.g., via resistive heating, a heat pump, etc.). The heater 750 may ensure that the natural gas remains at a safe working temperature (e.g., avoiding cryogenic conditions that could damage components not designed to handle cryogenic conditions, keeping the natural gas above −40° C.). According to various embodiments, the heater 750 may heat natural gas after the natural gas has left the tank 200 (e.g., in the fuel line 130). Alternatively, the heater 750 may heat the compressed natural gas within the tank 200. Heating the natural gas within the tank 200 (e.g., within vessels 550, 560) may help to maintain the pressure in vessels 550, 560, which may provide for more complete unloading of the natural gas in vessels 550, 560.

Similarly, the ship 1700 includes one or more heaters (not shown) configured to heat the natural gas and/or the residual fuels stored in vessels 500, 510. In various embodiments, the heaters are configured to heat the natural gas to a first temperature and the diesel (as stated above, when this disclosure refers to diesel, other fuels such as Bunker C are contemplated) to a second temperature. More specifically, residual fuels such as Bunker C must be heated to a viscosity suitable for fuel injectors (not shown) of the engine 30. In various embodiments, the Bunker C is stored in the tank 200 at 40 degrees Celsius, then heated to 120 degrees Celsius prior to entering the fuel injectors of the engine 30. The Bunker C can be heated directly in the tank 200 or while it passes through the fuel line 120. It should thus be appreciated that the viscosity of the Bunker C may be high while resident in the tank 200 and low while resident in the fuel line 120.

While the tank 200 is illustrated and described as having various particular structures (e.g., a variety of plates, ribs, gussets, etc.), various of these structures may be omitted without deviating from the scope of the present invention. For example, various reinforcing structures (e.g., ribs, blocks, etc.) may be removed or added, depending on the particular design goals of a particular dual-fuel tank, without deviating from the scope of the present invention.

The tank 200 is designed to withstand significant side impacts without rupturing diesel vessels 500, 510 or the compressed natural gas vessels 550, 560. According to various embodiments, the CNG vessels 550, 560 are disposed laterally inwardly from the diesel vessels 500, 510 (see FIG. 11). As a result, side impacts on the tank 200 will be absorbed by the diesel vessels 500, 510 (and the fuel therein) and frame 210, which mitigates side-impact force experienced by the CNG vessels 550, 560. According to various embodiments, disposing the CNG vessels 550, 560 in a more laterally central location than the diesel vessels 500, 510, the tank 200 may be able to withstand larger side impact loads without rupturing the vessels 500, 510, 550, 560 than would otherwise be possible. As shown in FIGS. 2-14, additional strengthening members (e.g., the side supports 310, the ribs 280, 290, 300) are added to the frame 210 of the tank 200 to further improve tank 200 resistance to side impacts.

As shown in FIG. 11, vessels 500, 510 extend generally outward (i.e., relative to the lateral center-line of the locomotive 10 that is generally co-planar with the central plate 270) farther than the laterally-outward-most portion of vessels 550, 560.

According to various embodiments, the plates 230, 240, 250, 260, 320, 330 and other structures that define the diesel vessels 500, 510 may be strengthened beyond the strength required for the diesel vessels 500, 510 themselves to withstand side-loads. Such strengthening may enable the diesel vessels 500, 510 to act as outer frames that protect the centrally disposed CNG vessels 550, 560. Thus the structural reinforcement to protect the CNG vessels 550, 560 may be integrated into the diesel vessels 500, 510. According to various embodiments, use of the diesel vessels 500, 510 as structural protection for the CNG vessels 550, 560 may reduce the overall cost of the tank 200. According to various alternative embodiments, vessels 550, 560 may be strengthened such that they are as strong as or stronger than the diesel vessels 500, 510.

According to various embodiments, the curved internal plates 260, as shown in FIG. 12 extend longitudinally through the dual-fuel tank 200. These plates, in conjunction with plates 240 define vessels 500 and 510. As stated above, in various embodiments, the curved internal plates 260 are absent, enabling fuel in vessels 500, 510 to contact vessels 550, 560.

Consequently, various embodiments of the tank 200 (and below discussed tanks 1200, 2200) provide the locomotive 10 with a safe and reliable fuel supply that will comply with U.S. Federal Railway Administration and Association of American Railroads requirements S-580, S-5506 respectively and/or newly developed AAR natural gas tender crashworthiness rules.

Figure 15:
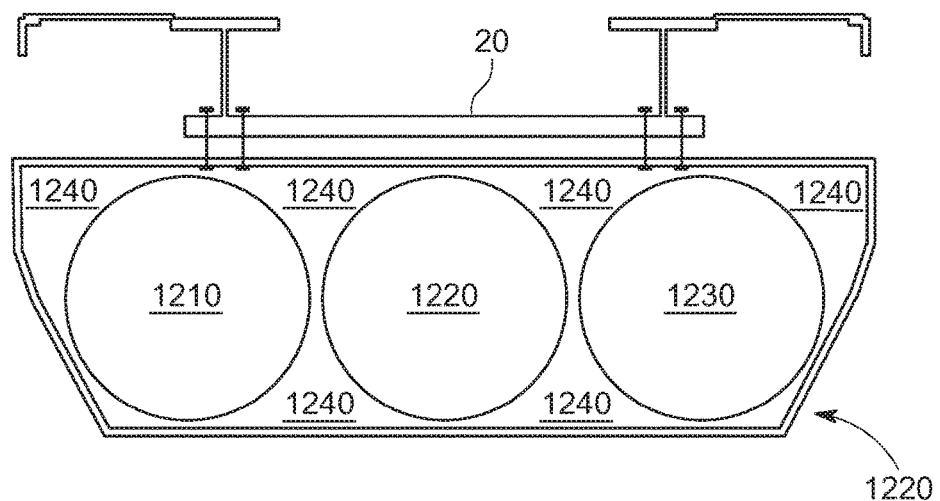
FIG. 15 is a diagrammatic cut-away view of a locomotive with a dual-fuel tank according to an alternative embodiment.

FIG. 15 is a diagrammatic cut-away view of a dual-fuel tank 1200 according to an alternative embodiment. The tank 1200 is generally similar to the tank 200, except that the tank 1200 comprises three compressed natural gas vessels 1210, 1220, 1230, rather than two. The diesel fuel vessel(s) 1240 is spread out between the various gaps between the natural gas vessels 1210, 1220, 1230.

The tank 1200 also differs from the tank 200 in another way. While the CNG vessels 550, 560 of the tank 200 were isolated from (i.e., not in direct contact with) the diesel fuel in vessels 500, 510 by the intermediate plates 260, the vessels 1210, 1220, 1230 are disposed inside of the diesel fuel vessel 1240 and directly contact the diesel fuel in the vessel 1240. According to various embodiments, the tank 200 may be modified in a similar manner such that vessels 550, 560 are disposed within vessels 500, 510 and directly contact the diesel fuel in the tank 200. The tank 1200 reduces the empty space within the tank 1200 by expanding the diesel fuel vessel 1240 to use a large portion of the tank 1200 space that is not taken up by the CNG vessels 1210, 1220, 1230.

Figure 16:
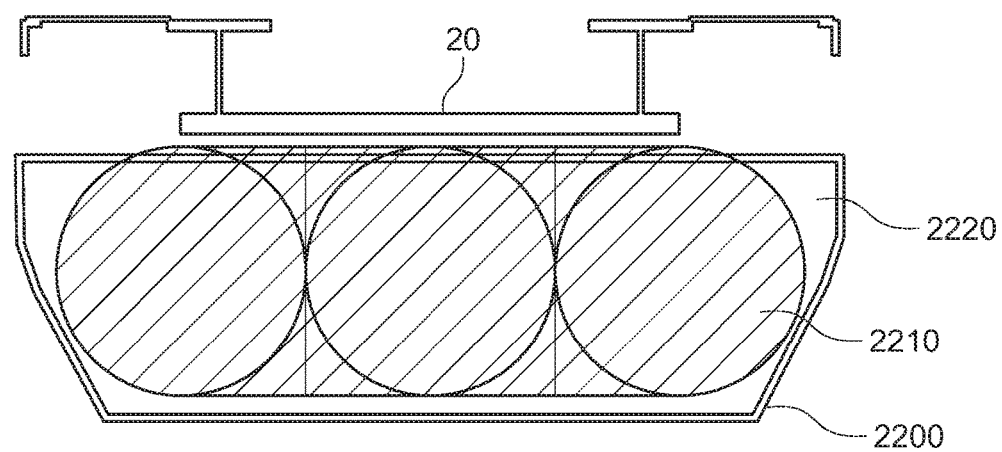
FIG. 16 is a diagrammatic cut-away view of a locomotive with a dual-fuel tank according to an alternative embodiment.

FIG. 16 is a diagrammatic cut-away view of a dual-fuel tank 2200 according to an alternative embodiment. The tank 2200 is generally similar to the tank 200, except that the tank 1200 comprises a single natural gas vessel 2210, rather than two. As shown in FIG. 16, the vessel 2210 may house pressurized cylinders (e.g., vessels 550, 560). Alternatively, the vessel 2210 may be directly filled with CNG. The vessel 2210 has a non-cylindrical cross-section that more closely conforms to the cross-sectional shape of the overall tank 2200. According to various embodiments, the vessel 2210 has a compressed natural gas storage capacity of at least 500, 600, 700, 800, 900, 1,000, 1,100, 1,200 and/or 1,300 DGE. According to various embodiments, the vessel 2210 has a compressed natural gas storage capacity of less than 5,000, 4,000, 3,000, 2,000, and/or 1,000 DGE. The vessel 2210 may include internal support structures that help it to retain its strength when under pressure. The diesel fuel vessel(s) 2220 is disposed laterally-outward of (and below according to various embodiments) the vessel 2210. In embodiments where the vessel 2210 houses pressurized cylinders, the vessel 2210 may, as shown in FIG. 16, extend from a top of the tank 2200 and directly attach to the underside of the chassis 20.

Relative to a comparably sized conventional diesel fuel tank for a locomotive and/or ship, the tank 200, 1200, 2200 may provide less overall energy (e.g., if the energy density of the natural gas is lower than the energy density of diesel fuel (on a volume basis)). However, the tank 200 may be more cost-efficient in view of the relative price of natural gas and diesel fuel. According to various embodiments, the dual-fuel locomotive 10 and/or the dual-fuel ship 1700 may be advantageous for short-haul or local runs that permit more frequent refueling than relatively longer-haul runs. In such short-haul runs, the capacity of a conventional diesel-only fuel tank may already exceed the energy requirements of the short-haul distance between refueling. As used herein, the term "short-haul" includes local locomotives, yard locomotives that generally remain in one geographic area and move railroad cars around and between tracks, and short and regional railroad lines. In these and other situations, the dual-fuel tank of the locomotive 10 and/or the ship 1700 may reduce fuel costs. According to various embodiments, the dual-fuel tank of the locomotive 10 and/or the ship 1700 facilitates the dual-fuel operation of the locomotive 10 and/or the ship 1700 without using a separate fuel tender.

In the illustrated tanks 200, 1200, 2200, the CNG vessels 550, 560, 1210, 1220, 1230, 2210 are in close proximity to and/or in direct contact with the diesel fuel (or, as explained above, Bunker C) in the diesel fuel vessels 500, 510, 1240, 2220. Such close proximity or contact may facilitate heat transfer between the diesel fuel and the compressed natural gas in the CNG vessels. Such heat transfer may reduce the extent to which the natural gas cools as it is unloaded from the vessels as the locomotive 10 uses fuel. The tanks 200, 1200, 2200 may therefore help to avoid cryogenic gas conditions. Conversely, such heat transfer may reduce the extent to which the natural gas heats up as it is loaded into the vessels during refueling.

In the illustrated embodiments, the fuel vessels 500, 510, 1240, 2220 are diesel fuel tanks. However, according to alternative embodiments, these vessels may be designed to store and store any other type of fuel (e.g., other liquid fuel, ethanol, methanol, gasoline, Bunker C, etc.) without departing from the scope of the present invention. According to various embodiments, the vessels 500, 510, 1240, 2220 are ambient pressure vessels that are generally designed to store fuel at the ambient environment pressure (e.g., within 30, 20, 10, and/or 5% of the ambient pressure in absolute pressure terms, within 50, 40, 30, 20, and/or 10 psi of the local ambient pressure).

In the illustrated embodiments, the vessels 550, 560, 1210, 1220, 1230, 2210 are compressed natural gas vessels. However, according to alternative embodiments, these vessels may be designed and configured to store any other suitable type of fuel (e.g., other compressed/pressurized fuel gasses, liquid natural gas, propane, adsorbed natural gas (ANG), in hydrate form natural gas (HNG), etc.).

Natural gas filling stations of the type described in PCT Publication Nos. WO2014/031999 and/or WO2014/153110 (both of which are hereby incorporated by reference in their entirety) may be use or sold with the tanks 200, 1200, 2200 to facilitate loading of compressed natural gas into vessels 550, 560.

The foregoing illustrated embodiments are provided to illustrate the structural and functional principles of embodiments of the present invention and are not intended to be limiting. To the contrary, the principles of the present invention are intended to encompass any and all changes, alterations and/or substitutions within the spirit and scope of the following claims.

The invention claimed is:

1. A dual-fuel railroad locomotive comprising:
a chassis;
a plurality of railroad wheels mounted to the chassis;
a dual-fuel diesel cycle engine supported by the chassis and operatively connected to the wheels to drive the wheels to propel the locomotive along a railroad track; and
a dual-fuel tank mounted to the chassis and in fluid communication with the dual-fuel diesel cycle engine, the dual-fuel tank including:
at least one liquid fuel vessel, and
at least one pressurized fuel vessel,
wherein the at least one liquid fuel vessel is positioned to form a side-impact buffer that protects the at least one pressurized fuel vessel from side-impacts.

2. The locomotive of claim 1, wherein the at least one liquid fuel vessel is disposed at least partially laterally outwardly from the at least one pressurized fuel vessel.

3. The locomotive of claim 1, wherein the at least one liquid fuel vessel extends laterally outwardly farther than any portion of the at least one pressurized fuel vessel.

4. The locomotive of claim 1, wherein the at least one liquid fuel vessel includes at least one diesel fuel vessel.

5. The locomotive of claim 1, wherein the at least one pressurized fuel vessel includes at least one compressed natural gas vessel.

6. The locomotive of claim 1, wherein the at least one liquid fuel vessel includes a void at least partially defined by a frame of the chassis.

7. The locomotive of claim 1, wherein the dual-fuel tank further includes at least one plate, the at least one plate including a first surface and a second surface opposing the first surface, wherein at least a portion of the at least one liquid fuel vessel directly contacts at least a portion of the first surface, and at least a portion of the at least one pressurized fuel vessel directly contacts at least a portion of the second surface.

8. A method of converting a railroad locomotive into a dual fuel locomotive, the method comprising:
removing a single-fuel tank from the railroad locomotive; and
mounting a dual-fuel tank to the railroad locomotive in place of the single-fuel tank, the dual-fuel tank including: at least one liquid fuel vessel and at least one pressurized fuel vessel,
wherein the at least one liquid fuel vessel is positioned to form a side-impact buffer that protects the at least one pressurized fuel vessel from side-impacts after said mounting.

9. The method of claim 8, further comprising, after said mounting, operatively connecting the at least one liquid fuel vessel and the at least one pressurized fuel vessel to the railroad locomotive so that the locomotive can be powered by fuel in the at least one liquid fuel vessel and the at least one pressurized fuel vessel.

10. The method of claim 8, wherein the at least one liquid fuel vessel includes a diesel fuel vessel.

11. The method of claim 8, wherein the at least one pressurized fuel vessel includes a natural gas vessel.

12. The method of claim 8, wherein the at least one liquid fuel vessel is disposed at least partially laterally outwardly from the at least one pressurized fuel vessel after said mounting.

13. A dual-fuel tank comprising:
a frame housing one or more liquid fuel vessels and one or more pressurized fuel vessels;
wherein the pressurized fuel vessels are disposed laterally inward of the liquid fuel vessels such that each of the liquid fuel vessels protect the pressurized fuel vessels from a lateral impact to the frame,
wherein the frame includes a first end plate and a second end plate and both of the first end plate and the second end plate support the pressurized fuel vessels.

14. The tank of claim 13, wherein the liquid fuel vessels include voids at least partially defined by the frame.

15. The tank of claim 14, wherein the voids are at least partially defined by curved internal plates longitudinally extending inside the frame.

16. The tank of claim 15, wherein the curved internal plates are C-shaped and form a barrier between the liquid fuel vessels and the pressurized fuel vessels.

17. The tank of claim 13, including at least one fuel line in fluid communication with each of the vessels, and at least one of the fuel lines includes an electric heater configured to heat the fluid flowing therethrough.

18. The tank of claim 13, wherein the first end plate and the second end plate cooperate to suspend at least one of the pressurized fuel vessels inside of the frame such that said pressurized fuel vessel is only supported by the first end plate and the second end plate.

19. The tank of claim 13, wherein the first end plate defines at least one longitudinally extending central ring void.

20. The tank of claim 19, including a slider ring slideably received in the at least one longitudinally extending central rings void, the slider ring being fixed to an end of one of the pressure vessels.

21. The tank of claim 13, wherein at least one of the pressurized vessels includes an inner rubber bladder encased in a non-sulfur reactive layer.

22. The tank of claim 21, wherein the non-sulfur reactive layer includes a winding that includes a cross-weave of aramid fibers and fiberglass.

23. The tank of claim 22, wherein the winding excludes carbon-fiber.

24. The tank of claim 21, wherein the at least one of the pressurized vessels includes a non-sulfur reactive insulator encasing the non-sulfur reactive layer.

25. A vehicle including an engine and the dual-fuel tank of claim 13, wherein the engine is configured to draw and combust fuel from each of the liquid fuel vessels and the pressurized fuel vessels.

26. The vehicle of claim 25, wherein the engine is configured to vary the ratio of combusted liquid fuel to the ratio of combusted pressurized fuel.

27. A ship comprising:
a dual-fuel engine configured to draw both liquid fuel and pressurized fuel from the dual-fuel tank of claim 13.

28. The ship of claim 27, wherein the liquid fuel vessels include Bunker C fuel.

29. The ship of claim 28, which includes a heater configured to lower the viscosity of the liquid fuel while the liquid fuel is drawn from the dual-fuel tank to the dual-fuel engine.

30. The ship of claim 27, wherein at least one of the pressurized vessels includes an inner rubber bladder encased in a non-sulfur reactive layer, and wherein the non-sulfur reactive layer is a winding that includes a cross-weave of aramid fibers and fiberglass, the winding has an inner portion and an outer portion, and a density of the inner portion is different than a density of the outer portion.

31. A dual-fuel tank comprising:
a frame housing one or more liquid fuel vessels and one or more pressurized fuel vessels;
wherein the pressurized fuel vessels are disposed laterally inward of the liquid fuel vessels such that each of the liquid fuel vessels protect the pressurized fuel vessels from a lateral impact to the frame,
wherein the liquid fuel vessels include voids at least partially defined by the frame, wherein the voids are at least partially defined by curved internal plates longitudinally extending inside the frame, and
wherein the curved internal plates are C-shaped and form a barrier between the liquid fuel vessels and the pressurized fuel vessels.

32. A dual-fuel tank comprising:
a frame housing one or more liquid fuel vessels and one or more pressurized fuel vessels;
wherein the pressurized fuel vessels are disposed laterally inward of the liquid fuel vessels such that each of the liquid fuel vessels protect the pressurized fuel vessels from a lateral impact to the frame,
wherein at least one of the pressurized vessels includes an inner rubber bladder encased in a non-sulfur reactive layer.

33. The tank of claim 32, wherein the non-sulfur reactive layer includes a winding that includes a cross-weave of aramid fibers and fiberglass.

34. The tank of claim 33, wherein the winding excludes carbon-fiber.

35. The tank of claim 32, wherein the at least one of the pressurized vessels includes a non-sulfur reactive insulator encasing the non-sulfur reactive layer.

36. A vehicle including:
an engine; and
a duel fuel tank, the dual-fuel tank comprising:
a frame housing one or more liquid fuel vessels and one or more pressurized fuel vessels,
wherein the pressurized fuel vessels are disposed laterally inward of the liquid fuel vessels such that each of the liquid fuel vessels protect the pressurized fuel vessels from a lateral impact to the frame,
wherein the engine is configured to draw and combust fuel from each of the liquid fuel vessels and the pressurized fuel vessels, and
wherein the engine is configured to vary the ratio of combusted liquid fuel to the ratio of combusted pressurized fuel.

37. A ship comprising:
a dual-fuel engine configured to draw both liquid fuel and pressurized fuel from a dual-fuel tank, the duel-fuel tank comprising:
a frame housing one or more liquid fuel vessels and one or more pressurized fuel vessels;
wherein the pressurized fuel vessels are disposed laterally inward of the liquid fuel vessels such that each of the liquid fuel vessels protect the pressurized fuel vessels from a lateral impact to the frame.

38. The ship of claim 37, wherein the liquid fuel vessels include Bunker C fuel.

39. The ship of claim 38, which includes a heater configured to lower the viscosity of the liquid fuel while the liquid fuel is drawn from the dual-fuel tank to the dual-fuel engine.

40. The ship of claim 37, wherein at least one of the pressurized vessels includes an inner rubber bladder encased in a non-sulfur reactive layer, and wherein the non-sulfur reactive layer is a winding that includes a cross-weave of aramid fibers and fiberglass, the winding has an inner portion and an outer portion, and a density of the inner portion is different than a density of the outer portion.

\* \* \* \* \*